April 14, 1936. G. SLAYTER Re. 19,929

METHOD OF HEAT INSULATING

Original Filed Sept. 30, 1927

Inventor

James Slayter

By Whittemore, Hulbert & Whittemore

Attorneys

Reissued Apr. 14, 1936 Re. 19,929

UNITED STATES PATENT OFFICE 19,929

METHOD OF HEAT INSULATING

Games Slayter, Newark, Ohio, assignor to Slayter & Company, Chicago, Ill., a corporation of Illinois Original No. 1,728,837, dated September 17, 1929, Serial No. 223,144, September 30, 1927. Application for reissue January 22, 1936, Serial No. 60,299

1 Claim. (Cl. 72—16)

This invention relates to method for heat insulating buildings and the like and refers more particularly to an improved process by means of which houses or other buildings already standing can be conveniently, economically and efficiently heat insulated although the invention in certain of its broader aspects is not limited to the heat insulation of buildings already constructed.

Another object of the invention is to provide a material which can be economically produced and applied in the walls of the building in the carrying out of the method and which in addition to its heat insulation qualities will be fire-resisting. The invention also resides in such further features of the process as will more fully hereinafter appear.

Figure 1:
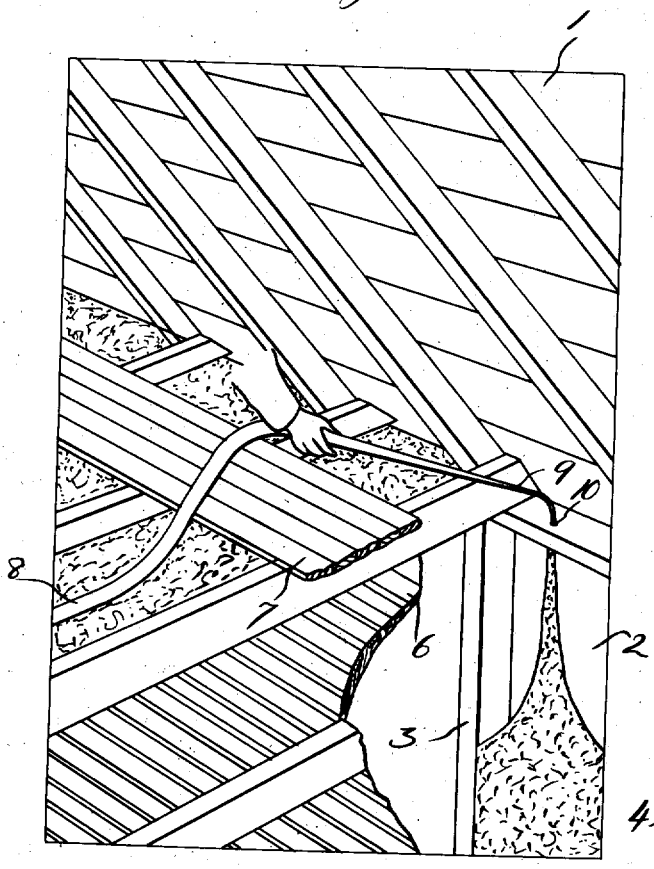
Figure 1 illustrates a perspective view showing one manner of applying the material, the material being supplied to a building already constructed.
Figure 2:
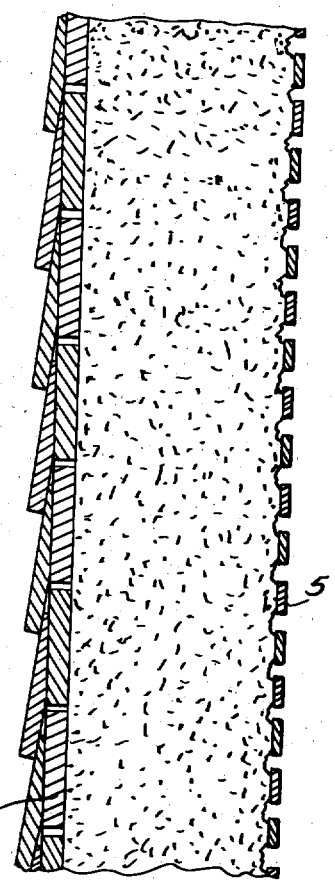
Figure 2 is an enlarged vertical section of one of the walls showing the heat insulation in place.

Describing in detail the particular embodiment of my invention illustrated, 1 designates a building having the side walls 2 formed with the uprights 3 to the opposite sides of which are fixed the outer boards or sheathing 4 and to the inner side of which are secured the laths 5. Ordinarily, in the construction of buildings there is a dead air space left between the outer sheathing 4 and the lath 5 and there is also a space left between the ceiling 6 and the attic or top floor 7.

In the present novel invention I utilize this space as a means for containing the heat insulating material and it is inserted by the following novel arrangement: The material is blown or otherwise forced through a hose 8 having a nozzle 9, the operator cutting necessary inlet holes 10 through which the nozzle can be inserted. The insulating material is then forced through the nozzle 9 and hole 10 successively into the dead air compartments in the walls and the floors of the building.

While various changes may be made in the insulating material used, one material which I have found successful is the use of comminuted corn cobs and paper in a ratio of one-half cubic foot each or by weight 9 lbs. of corn cob to $\frac{3}{10}$ lb. of paper, this being mixed with 9 lbs. of plaster of Paris and 2 oz. zinc chloride, lime or other suitable fungicide. The finely comminuted corn cobs and paper are mixed with the plaster of Paris and the zinc chloride in a machine which is not described in detail but made the subject matter of a separate application, and sufficient moisture is added to permit the handling of the material without unnecessary dust. The moisture content, however, is limited with reference to the self-absorption quality of the plaster of Paris; that is the plaster of Paris being dehydrated gypsum, it will absorb up to 15% of its weight, and the moisture content of the insulating material should not materially exceed such 15% of the weight of the plaster of Paris content. A material so prepared will be found to weigh not more than approximately 20 pounds per cubic foot. While the moisture content is sufficiently low to prevent any damage to the walls or the decorations thereon, when the insulation is installed, there is in the completed installation in the form of water of crystallization of the plaster of Paris, sufficient water content to make the material fire resistant. In case of fire, the insulation material can not be heated above a temperature of 209° F. until the water of crystallization in the plaster of Paris or gypsum is driven off. This under ordinary conditions provides effective fire resistance for a number of hours. In order to prevent the too rapid setting of the plaster of Paris, a retarder such as a small amount of mineral oil is employed. Also, the use of low moisture content permits the comminuted material to have a large number of minute air spaces which greatly increase the heat and cold resisting properties of the insulation. The material is preferably pneumatically applied and the present novel process of insulation permits the insulation to take place in homes and other buildings already built as well as those in the process of construction. While I have described one material and one method of applying it, I do not wish to limit the method to the particular material mentioned, except as ultimately set forth in the claim.

By the term "comminuted material" is, of course, included various degrees of fineness but does not mean that the material is reduced to a powdered condition. In fact the particles are preferably of sufficient size to give a large body for the amount of weight.

What I claim as my invention is:

The method of building a wall whereby to increase the insulating and fire-resisting properties thereof without undue added weight, which method comprises utilizing spaced apart walls of a building previously constructed as a form for receiving heat insulating material, providing openings to afford access to the air spaces between said spaced apart walls, inserting the outlet end of a conduit through said openings, and pneumatically forcing through the said conduit a finely divided but not powdered heat insulating and fire-resisting material, said material being substantially free from dust and of low specific gravity and of a size to provide a large body for the amount of weight and substantially devoid of free moisture content whereby said wall is heat insulated and rendered fire resistant without bulging or damage to the surface thereof or to decorations thereon.

GAMES SLAYTER.